United States Patent [19]

Terui et al.

[11] 4,437,744
[45] Mar. 20, 1984

[54] AUTOMATIC EXPOSURE CONTROL APPARATUS FOR CAMERA

[75] Inventors: Nobuhiko Terui; Kenichi Magariyama, both of Tokyo, Japan

[73] Assignee: Nippon Kogaku K.K., Tokyo, Japan

[21] Appl. No.: 341,809

[22] Filed: Jan. 22, 1982

[30] Foreign Application Priority Data

Jan. 30, 1981 [JP] Japan .................................. 56-12306

[51] Int. Cl.³ .............................................. G03B 7/097
[52] U.S. Cl. ..................................... 354/442; 354/412
[58] Field of Search ........................ 354/25, 36, 43, 38

[56] References Cited

U.S. PATENT DOCUMENTS 4,213,682  7/1980  Yamada .............................. 354/43 X
4,264,810  4/1981  Utagawa et al. ...................... 354/25

*Primary Examiner*—Michael L. Gellner
*Attorney, Agent, or Firm*—Shapiro and Shapiro

[57] ABSTRACT

Aperture-priority, shutter-priority, and programmed automatic exposure modes may be selected, with or without automatic focus control. For certain types of operation, the diaphragm value of a photographic lens is set to a value between maximum and minimum diaphragm values in response to measurement of the luminance value of an object, and when the set diaphragm value is smaller than a predetermined diaphragm value at which the lens has a predetermined depth of focus, the diaphragm is adjusted to the predetermined diaphragm value, and the shutter time (speed) is adjusted accordingly to provide a proper exposure.

7 Claims, 3 Drawing Figures

4,437,744

AUTOMATIC EXPOSURE CONTROL APPARATUS FOR CAMERA

BACKGROUND OF THE INVENTION

1. Field of the Invention

The present invention relates to an automatic exposure control apparatus for a camera. More particularly, the present invention relates to an automatic exposure control apparatus suitable for a camera having an automatic focus adjusting device.

2. Description of the Prior Art

Various automatic focusing apparatus have been proposed and used in the art. However, when such automatic focusing apparatus is incorporated in a camera, problems in respect of focus detection accuracy (resolving power) arise. Because of limitations in detection accuracy, it is difficult to fully enjoy the merit of built-in automatic focus adjusting apparatus. As a solution to the problem, it has been proposed to compensate the insufficient resolving power by making use of the depth of focus which can be changed by changing the diameter of the diaphragm aperture. In other words, when a picture is taken using an automatic focusing apparatus, it has been proposed to select a diaphragm value which may render the depth of focus larger than a determined value.

Automatic exposure control apparatus available at present may be classified generally into three types, namely shutter priority automatic exposure control system, diaphragm priority automatic exposure control system and programmed automatic exposure control system.

In the case of automatic exposure control of shutter priority AE mode, the shutter time is fixed constant. A proper exposure is obtained by changing the diaphragm value according to the luminance of the object. Therefore, for a dark object, the diaphragm may be set to a very small value (a very large diaphragm aperture). Similarly, in the case of programmed AE mode, a smaller diaphragm value is used for a darker object.

If an automatic focusing apparatus is incorporated into such an automatic exposure control type of camera, then difficulties arise in taking a picture of a dark object. When the object is dark, the depth of focus resulting from the diaphragm value then automatically set becomes small. To adjust the focus within the given small depth of focus, an extremely high precision is required for the focus detection part and also the lens positioning mechanism in the camera. This involves great technical difficulties and also intolerably high cost. Furthermore, there is the possibility that the focus is no longer adjustable to a point within the depth of focus, and the picture may be out of focus although the exposure is proper.

SUMMARY OF THE INVENTION

Accordingly, it is an object of the invention to provide an improved automatic exposure control apparatus for a camera which is particularly suitable for a combination of automatic diaphragm control and automatic focus adjustment.

It is a more specific object of the invention to provide an automatic exposure control apparatus which is provided with an additional function to limit the diaphragm value in such manner that picture taking is never done at so small a diaphragm value (so large diaphragm aperture) as to have an adverse effect on the accuracy of focus detection.

To attain the above objects according to the invention, there is provided an improved automatic exposure control apparatus for a camera, in particular, for a camera in which diaphragm value and shutter time (second) can be automatically set. The improved automatic exposure control apparatus comprises a diaphragm setting device for automatically setting the lens aperture stop according to the luminance value of the object, means able to act on said automatic diaphragm setting device in such manner that when the automatically set diaphragm value is smaller than a predetermined value at which a predetermined depth of focus can be obtained, the aperture adjusted to the predetermined diaphragm value, and an automatic shutter time setting device for automatically setting the shutter time depending on the diaphragm value actually set by said automatic diaphragm setting device and the luminance value of the object.

Other and further objects, features and advantages of the invention will appear more fully from the following description taken in connection with the accompanying drawings.

DETAILED DESCRIPTION OF PREFERRED EMBODIMENTS

Figure 1:
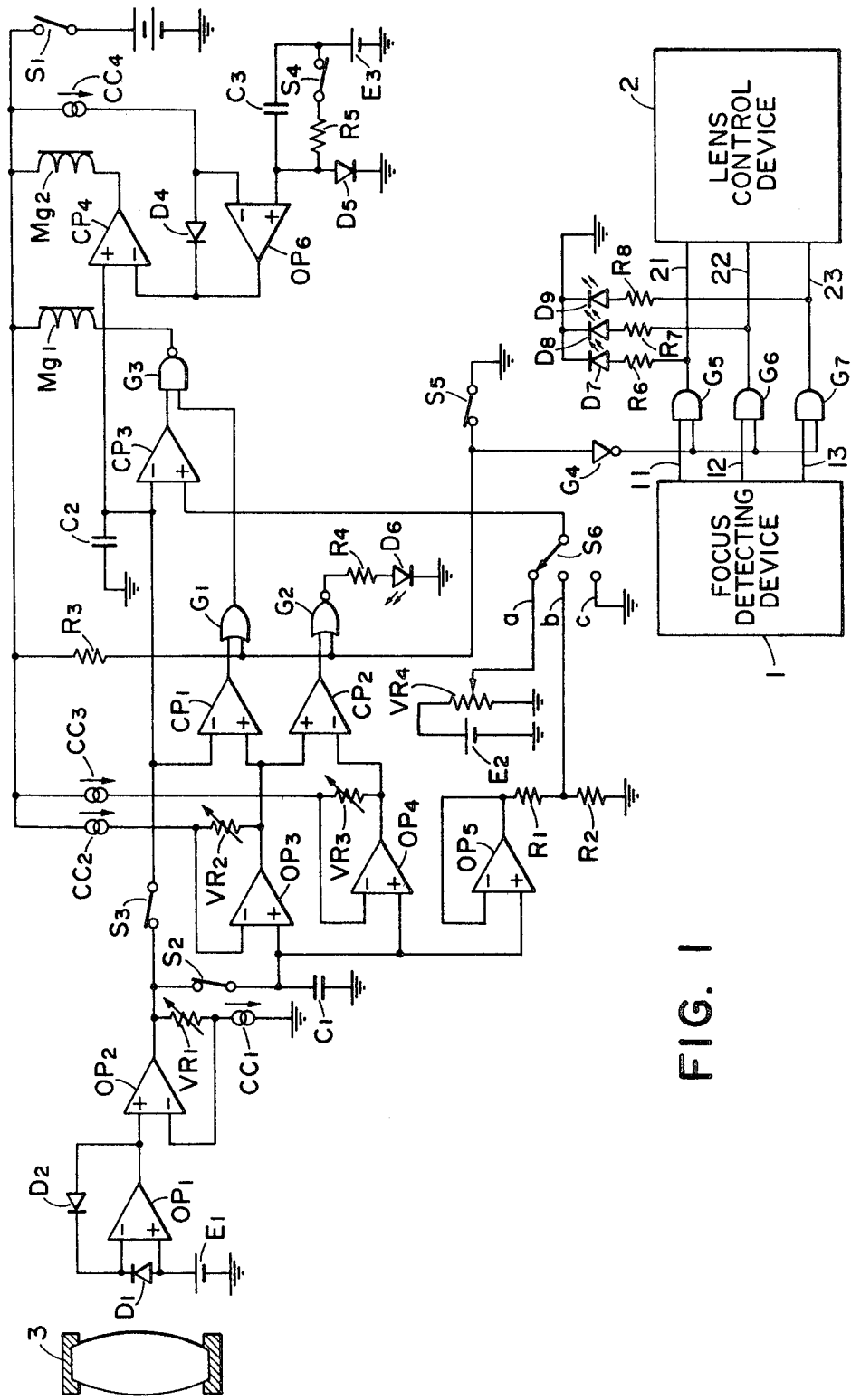
FIG. 1 is a circuit diagram showing an embodiment of the invention.

In FIG. 1, showing an embodiment of the present invention, 1 is a focus detecting device which is a known device as disclosed, for example, in U.S. Pat. No. 4,264,810. The focus detecting device 1 is so formed as to produce an output signal 11, 12, or 13 when the photographic lens 3 is in front focus, in rear focus or in focus relative to the object respectively.

The output 11 becomes high level (High) when the lens is in front focus and it is low level (Low) for all other times. The output 12 becomes High when the lens is in rear focus and it remains Low for all other times. The output 13 becomes High when the lens is in focus and it is Low for all other times.

2 is a lens control device which includes an electric motor for driving the photographc lens and a circuit for controlling the supply of DC power to the motor. The lens control device 2 has three inputs 21, 22, and 23. When the input 21 becomes High, the lens control device drives the lens in the direction toward rear focus, that is, in the direction toward infinity from the side of near distance. When the input 22 becomes High, the focus control device drives the lens in the direction toward front focus. When the input 23 becomes High, it stops the lens. $G_5$, $G_6$ and $G_7$ are AND gates and $G_4$ is an inverter. When the output of the inverter $G_4$ is High, AND gates $G_5$, $G_6$ and $G_7$ produce the same outputs as the outputs 11, 12 and 13 from the focus detecting device respectively. When the output of the inverter $G_4$ is Low, the outputs of AND gates $G_5$, $G_6$ and $G_7$ are Low irrespective of other inputs. The focusing state of the photographic lens is visible on a display device comprising LED $D_7$, $D_8$, $D_9$ and current control resistors $R_6$, $R_7$, $R_8$. Of the three light emitting diodes, $D_7$ is used for display of front focus, $D_8$ is for rear focus and $D_9$ is for in-focus.

As readily understood from the above, when the output of the inverter $G_4$ is low, AND gates $G_5$-$G_7$ have Low level outputs and LED $D_7$-$D_9$ are Off. Therefore, the lens control device 2 does not drive the lens 3. However, when the output of the inverter $G_4$ is High, the output from AND gates $G_5$-$G_7$ becomes the same state as that of the outputs 11-13 from the focus detecting device 1 and LED $D_7$-$D_9$ display the focusing state at that time. Accordingly, the lens control device 2 drives the lens.

A photo diode $D_1$ receives the light transmitted through the lens 3. A logarithmic compression diode $D_2$, an operational amplifier $OP_1$ and a voltage source $E_1$ constitute together a light metering circuit. The function of the voltage source $E_1$ is to cancel the temperature factor of the compression diode $D_2$. With this arrangement of the metering circuit, the output from the operational amplifier $OP_1$ represents the logarithmically compressed intensity of the light passed through the lens 3. In APEX notation, the output can be expressed by $(Bv-Av)$ wherein Bv is the luminance value of the object and Av is the diaphragm value of the lens. The diaphragm value may be any value in the range of from the maximum aperture (the minimum F-number) to the minimum aperture.

$VR_1$ is a variable resistor whose resistance value can be set depending on the film speed. $CC_1$ is a constant current source and $OP_2$ is an operational amplifier. The output $(Bv-Av)$ of the operational amplifier $OP_1$ is applied to the non-inversion input of the operational amplifier $OP_2$. Receiving the constant current from $CC_1$, the variable resistor $VR_1$ has between its ends a voltage determined depending on the film speed (Sv in APEX notation). Therefore, the output from the operational amplifier $OP_2$ is $(Bv-Av+Sv)$.

$S_2$ is a switch whose contact is normally in the position of ON and is turned OFF simultaneously with shutter releasing operation. When the switch $S_2$ is turned OFF simultaneously with a shutter releasing operation, a capacitor $C_1$ stores the output of the operational amplifier $OP_2$, that is, the value of $(Bv-Av+Sv)$ at that time. $S_3$ is a switch whose contact is turned OFF after the lens diaphragm aperture has been stopped down to a determined diaphragm value after shutter releasing and immediately before the sequence is shifted to the next one. Then, a capacitor $C_2$ is connected to the switch $S_3$ to store the output $(Bv-Av+Sv)$ of the operational amplifier $OP_2$ appearing after the diaphragm value has been set to the determined value.

$VR_2$ is a variable resistor whose resistance value is variable in accordance with a signal means provided on the mount of the lens 3. Said signal means is indicative of the minimum F-number of the lens. $CC_2$ is a constant current source by which the voltage between ends of the variable resistor $VR_2$ is set to a value corresponding to the existing value of $(\alpha-f_0)$ wherein $f_0$ is the minimum F-number of the lens ($Av_0$ in APEX notation) and $\alpha$ is a constant as described later. From the output of the operational amplifier $OP_2$ and the output of the variable resistor $VR_2$, a third operational amplifier $OP_3$ produces an output, $\{Bv-Av+Sv-(\alpha-Av_0)\}$.

A third variable resistor $VR_3$ receives a signal $(f'-f_0)$ from the lens 3 and has resistance value corresponding to the signal. The signal $(f'-f_0)$ corresponds to the number of diaphragm steps required to stop down the lens diaphragm aperture from the minimum F-number to a preset aperture value. f' is the preset diaphragm value ($Av'$ in APEX notation) and $f_0$ is the above mentioned minimum F-number. When the variable resistor $VR_3$ is connected to a constant current source $CC_3$, the variable resistor $VR_3$ has between ends a voltage corresponding to the signal $(f'-f_0)$. From the output of the operational amplifier $OP_2$ and the output of the variable resistor $VR_3$, a fourth operational amplifier $OP_4$ produces an output of $\{Bv-AV+Sv-(Av'-Av_0)\}$.

The output of the operational amplifier $OP_2$ is also applied to an input of voltage follower $OP_5$. Therefore, the output of the voltage follower $OP_5$ is $(Bv-Av+Sv)$. Let $\beta$ denote the voltage dividing ratio of the resistors $R_1$ and $R_2$. Then, the terminal voltage of $R_2$ becomes a value corresponding to $\beta(Bv-Av+Sv)$.

$E_2$ is a reference voltage source and $VR_4$ is a variable resistor the middle point of which is slide movable according to the shutter time (second) then set.

$CP_1$, $CP_2$ and $CP_3$ are comparators, $G_1$ is an OR gate, $G_2$ is a NOR gate, $G_3$ is a NAND gate and $R_3$ is a pull-up resistor. $R_4$ is a current control resistor for LED $D_6$. $S_5$ is a switch for switching over the position of the automatic focusing apparatus between active position and inactive position. Mg1 is a diaphragm control magnet. When the supply current flows into the coil, the magnet Mg1 actuates a diaphragm locking lever (not shown) to stop the movement of the diaphragm for stopping down the lens aperture.

The comparator $CP_1$ compares the output from $OP_2$, $(Bv-Av+Sv)$ with the output from $OP_3$, $\{Bv-Av+Sv-(\alpha-Av_0)\}$. When $Br-Av+Sv<Bv-Av+Sv-(\alpha-Av_0)$ then the output of the comparator $CP_1$ becomes High.

The second comparator $CP_2$ compares the output from the operational amplifier $OP_3$, $\{Bv-Av+Sv-(\alpha-Av_0)\}$ with the output from $OP_4$, $\{Bv-Av+Sv-(Av'-Av_0)\}$. When $Bv-Av+Sv-(\alpha-Av_0)<Bv-Av+Sv-(Av'-Av_0)$, the output of the comparator $CP_2$ becomes High.

$S_6$ is a switch for changing over the mode of automatic exposure. For shutter priority AE mode, the terminal a is selected, for programmed AE mode the terminal b is selected and for diaphragm priority AE mode the terminal c is selected. When the automatic exposure contol mode then selected is the programmed AE mode or the shutter priority AE mode, the third comparator $CP_3$ compares the output from $OP_2$, $(Bv-Av+Sv)$ with the contact voltage $Vs_6$ of the switch $S_6$. When $Vs_6>Bv-Av+Sv$, the output of the comparator $CP_3$ becomes High.

A comparator $CP_4$, an electromagnet Mg2 for holding the closing blade of a focal plane shutter, a constant current source $CC_4$, diodes $D_4$ and $D_5$, an operational amplifier $OP_6$, a resistor $R_5$, a timer capacitor $C_3$, a constant voltage source $E_3$ and a trigger switch $S_4$ constitute a known shutter time determining circuit. Simultaneously with the start of running of the shutter first blind, the trigger switch $S_4$ is turned off and a time logarithmic conversion circuit constituted of $OP_6$, $C_3$, $D_4$ and $D_5$, $R_5$ and $CC_4$ is brought into operation. Thus, from the operational amplifier $OP_6$ there is produced an output voltage which changes with time according to the shutter time in second (Tv in APEX notation). The output of the comparator $CP_4$ becomes High when the output Tv from the operational amplifier $OP_6$ reaches the level equal to the voltage stored in the capacitor $C_2$, that is, $(Bv-Av+Sv)$. At the time, the current supply to the electromagnet Mg2 is cut off, its fore for holding the shutter second blind, and the latter is allowed to start running.

The manner of operation of the circuit shown in FIG. 1 is as follows:

For the purpose of explanation, it is assumed that the switch S5 is now closed to apply the output of the focus detecting device 1 to the lens control device 2 through AND gates G5, G6 and G7 and that the mode change-over switch S6 is now in contact with the terminal a for shutter priority AE mode.

Starting from the above position of the apparatus, the photographer closes the power source switch S1 and directs his camera toward the object. At that time, the output from the focus detecting device 1 is introduced into the lens control device 2 to move the lens up to in-focus position. The lens is stopped at the in-focus position. On the other hand, within the camera, TTL photo metering at the minimum F-number is being performed at the time. Therefore, the operational amplifier OP2 produces an output voltage corresponding to $Bv-Av+Sv$. Subsequently, the photographer pushes down the release button. Thereby the switch S2 is turned off and the voltage corresponding to the existing value of $(Bv-Av+Sv)$ is stored in the capacitor C1.

After the turn-off of the switch S2, the diaphragm aperture of the lens is stopped down from the minimum F-number. During this stop-down motion, the photo metering circuit continues operating and the photo current of the photo diode D1 decreases gradually with increasing of the stop-down. Consequently, the output of the operational amplifier OP1 changes depending on the value of $(Bv-Avs)$ wherein Avs is the diaphragm value during stop-down in APEX notation which is variable depending on the step of the stop-down.

During the stage of stopping down the lens aperture, the comparator CP1 continues to compare the output of the operational amplifier OP2 with that of OP3. Also, the comparator CP3 compares the output of OP2 with that of the variable resistor VR4. The two inputs to the first comparator CP1 become equal to each other when the output of the operational amplifier OP2 becomes $Bv+Sv-\alpha$ because the output of OP3 is fixed to the value of $Bv+Sv-Av_0-(\alpha-Av_0)$ by turn-off of the switch S2. In other words, the two inputs to the comparator CP1 becomes equal to each other when the aperture has just been stopped down by a number of steps corresponding to $\alpha-Av_0$ starting from the minimum F-number $Av_0$. This time point is fixed independently of the condition of the object because the two inputs contain already the information of the object condition $(Bv+Sv=Ev)$.

On the contrary, the time point at which the two inputs to the comparator CP3 become equal to each other is variable depending on the object condition (Ev).

For the reason mentioned above, the operation during stop-down is divided into first and second operations of which a detailed description will be made later.

Now, for the purpose of explanation, it is assumed that the lens mounted on the camera body is an exchangeable lens of the minimum F-number being 1.4 ($Av_0=1$), the shutter time preset by using the shutter dial on the camera body is 1/125 sec. ($Tv=7$) and the constant $\alpha$ is set to 4 ($\alpha=4$). Further, in the case of shutter priority AE mode, the minimum F-number is selected, for example, by the diaphragm preset ring of the exchangeable lens so that the aperture can be stopped down from the minimum F-number to the maximum.

(1) First operation:
This operation takes place for the following condition:

$$Tv \leqq Bv+Sv-Av_0-(\alpha-Av_0) \qquad (1)$$

More concretely, this first operation takes place for such object conditions ($Ev \geqq 11$) under which a proper exposure can be obtained by stopping down the aperture by three or more steps starting from the minimum F-number ($Av_0=1$) for the preset shutter time ($Tv=7$).

For example, assuming that the object condition $Ev=11$, the output from OP2 and that from OP3 will become equal to each other when the aperture is stopped down three steps from the minimum F-number. At this time point, the output of the comparator CP1 becomes High. At the same time, the output of the comparator CP3 also becomes High because the output of the operational amplifier OP2 and the output of the variable resistor VR4 become equal to each other, namely, $Tv=Bv+Sv-Avs$ when the aperture has been stopped down three steps from the minimum F-number.

As another example, assuming that the object condition $Ev=17$, the outputs of the operational amplifiers OP2 and OP3 will become equal at the same time point as in the above example but the time point at which the output of the variable resistor VR4 and the output of the operational amplifer OP2 will be later than the time point at which the outputs of OP2 and OP3 become equal. This is because the aperture must be stopped down by nine steps starting from the minimum F-number until $Tv=Bv+Sv-Avs$. When the aperture has been stopped down by nine steps, the output of the comparator CP3 becomes High.

In summary, under the above condition (1), the time point at which the output of the comparator CP3 becomes High is the same as or later than the time point at which the output of the comparator CP1 becomes High.

Figure 2:
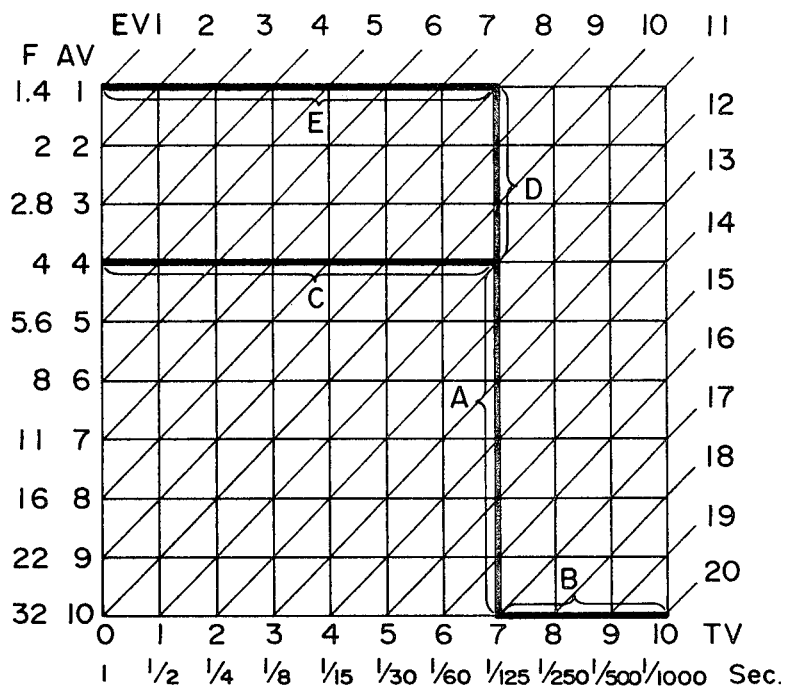
FIG. 2 is a characteristic curve showing the relation between EV value, diaphragm value (F-number) and shutter time (second) in shutter priority AE mode.

When the output of the comparator CP1 is turned to High, the output of OR gate G1 is also turned to High (if $Ev=11$, then the output of the comparator CP3 also becomes High at this time point). If $Ev=17$, the aperture is further stopped down. When the aperture has been stopped down by nine steps, that is, until $Av=10$ ($F=32$), the output of the operational amplifier OP2 becomes equal to that of the variable resistor VR4 and therefore the output of the comparator CP3 becomes High. This is the time when both of the outputs of the comparators CP1 and CP3 are High. Therefore, the output of NAND gate G3 is inverted to Low and the diaphragm control magnet Mg1 is energized to actuate the diaphragm locking lever (not shown). Upon the actuation of the locking lever, the stop-down motion is stopped and the switch S3 is turned Off. The existing output $(Bv+Sv-Avs)$ of the operational amplifier OP2 is stored in the capacitor C2. In the following timing, the shutter first blind starts running. Simultaneously with the start of running of the first blind, the trigger switch S4 is opened and the time logarithmic conversion circuit is brought into operation. When the non-inversion input of the comparator CP4 becomes equal to the output $(Bv+Sv-Avs)$ of the operational amplifier OP2, the output of the comparator CP4 is turned to High. Therefore, the current supply to the magnet Mg2 is cut off and the shutter second blind starts running to terminate the exposure. The relation between shutter time in second and diaphragm value (F-number) in this operation is shown at area A in FIG. 2.

When the object condition Ev is over 17, the output of the operational amplifier $OP_2$ never becomes smaller than the output of the variable resistor $VR_4$ even if the lens aperture is stopped down to the maximum F-number. Therefore, in this case, the output of the comparator $CP_3$ never becomes High and the diaphragm control magnet Mg1 does not operate. Consequently, the aperture stopping-down motion is stopped at the final step of the maximum F-number (F=32). However, since the output of the operational amplifier $OP_2$ is (Bv+Sv−Avs) and the shutter time is controlled by a comparator $CP_4$ to which the outputs of the operational amplifiers $OP_2$ and $OP_6$ are introduced in this embodiment, the shortage of stop-down is automatically compensated by shortening the shutter time. Thus, a proper exposure can be attained even if the stop-down of the aperture is insufficient.

In the same manner, the timing error in stopping the stop-down motion caused by the time lag from the excitation of magnet Mg1 to the actuation of diaphragm locking lever can be compensated. The relation between shutter time in second and diaphragm value (F-number) in this operation is shown at area B in FIG. 2.

(2) Second operation:

This operation takes place under the following condition:

$$Tv > Bv + Sv - Av_0 - (\alpha - Av_0) \quad (2)$$

more specifically, this second operation takes place for such object condition (Ev=11) under which a proper exposure can be obtained by stopping down the lens aperture up to any step within three steps starting from the minimum F-number ($Av_0=1$) for the preset shutter time (Tv=7).

Under this condition, as previously mentioned, the output of the comparator $CP_1$ becomes High when the aperture has been stopped down by three steps from the minimum F-number. On the other hand, the output of the comparator $CP_3$ becomes High before the start of stop-down or before the aperture has been stopped down up to the third step from the minimum F-number. The reason for this is that when Ev<11, the output of $OP_2$ and the output of $VR_4$ become equal to each other before the aperture has been stopped down three steps. However, even after the output of the comparator $CP_3$ has become High, the output of OR gate $G_1$ can not become High and therefore the output of NAND gate $G_3$ can not become Low before the output of the comparator $CP_1$ becomes High. As a result, the aperture is forcedly stopped down by three steps so that the diaphragm value is set to 4 (F=4).

Therefore, in this case, the output of the operational amplifier $OP_2$, namely, (Bv+Sv−Avs) is not equal to the output (Tv) of the variable resistor $VR_4$. However, since the output stored in the capacitor $C_2$ by the turn-off of the switch $S_3$ after the stop of the stop-down motion is (Bv+Sv−Avs), the excess of stop-down caused by the forced stop-down is compensated by making the shutter time longer. The relation between diaphragm value and shutter time in this operation is shown at area C in FIG. 2.

In this manner, the aperture is automatically set to a diaphragm value more stopped down than the diaphragm value necessary to obtain a certain determined depth of object field, thereby compensating the insufficient accuracy in finding distance by the automatic focusing apparatus. This prevents the picture taken from being out of focus.

In the above, there has been described the manner of exposure control operation in the case that the switch $S_5$ is ON and the automatic focusing apparatus is active. Now, there will be described the manner of exposure control operation in the case that the switch $S_5$ is Off and the automatic focusing apparatus is inactive.

When the switch $S_5$ is Off, one of the inputs of OR gate $G_1$ remains always High and therefore the output of the gate $G_1$ is High irrespective of the level of the output from the comparator $CP_1$. Therefore, the state of NAND gate $G_3$ is determined depending solely on the state of the output from the comparator $CP_3$.

In this position of the apparatus, so long as the object condition $Ev \geq 11$, there is performed the same exposure control operation as that of the above first operation. When Ev<11, the output of OR gate $G_1$ is High even if the output of the comparator $CP_1$ is Low. Therefore, when the output of the comparator $CP_3$ is turned to High, a current is supplied to the magnet Mg1 to lock the diaphragm. The relation between aperture value and shutter time in this operation is shown at area D in FIG. 2.

When Ev<11, there is the case where the aperture has to be somehow opened from the minimum F-number to obtain a proper exposure. In this case, the shutter time is controlled according to the output of the operational amplifier $OP_2$ at that time while maintaining the diaphragm at the minimum F-number. In other words, the actually controlled shutter time is made longer than the preset shutter time so as to compensate the insufficient aperture. The state then is shown at area E in FIG. 2.

In the above operation, the diaphragm value to be automatically set is variable depending on the preset shutter time so long as the object condition is constant.

In the case that the terminal b is selected by the mode changeover switch $S_6$ (programmed AE mode), the following operation is perfomred:

In this case, the output applied to the non-inversion input of comparator $CP_3$ is not the output of the variable resistor $VR_4$ but the voltage divided output of the operational amplifier $OP_5$, that is, $\beta(Bv+Sv-Av_0)$. This voltage divided output is variable depending on the existing luminance value of the object after the lens aperture and the film sensitivity have once been determined. In APEX notation, this voltage divided output represents the shutter time in second (which is referred to as $T_{VP}$).

Therefore, the control operation for programmed AE mode is basically the same as that for shutter priority AE mode. The difference between the two cases is found in only that in the case of shutter priority AE mode, one can set the shutter time ($T_{VM}$) at his will and the diaphragm value required for obtaining a proper exposure relative to the set shutter time ($T_{VM}$) is variable depending on the object condition (Ev). In the case of programmed AE mode, the shutter time ($T_{VP}$) and the diaphragm value are determined directly by the object condition (Ev) at that time.

Figure 3:
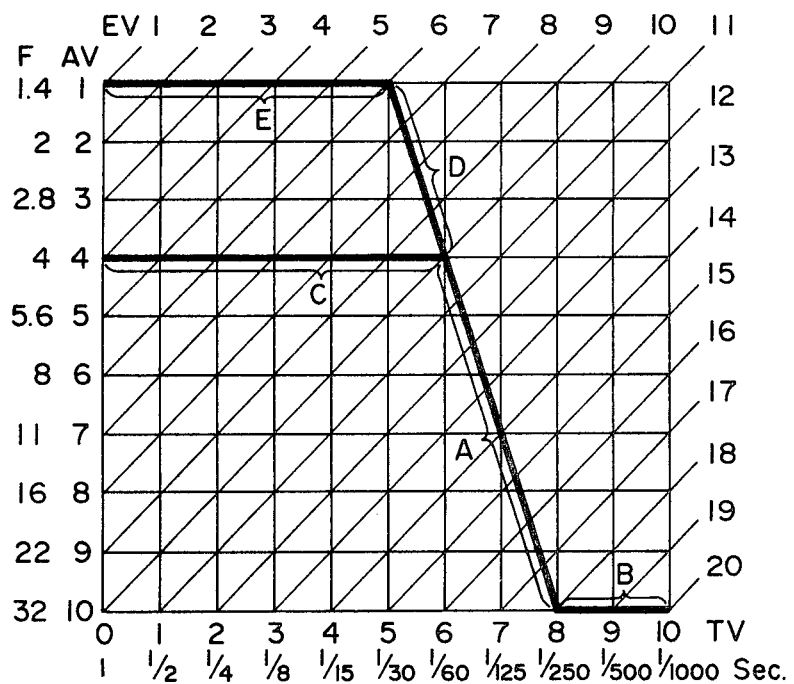
FIG. 3 is a characteristic curve showing the relation between EV value, diaphragm value (F-number) and shutter time (second) in programmed AE mode.

When the object condition Ev is in the range of 18 to 10, the output of the comparator $CP_1$ at first becomes High simultaneously with the start of aperture stopping-down motion irrespective of whether the switch $S_5$ is On or Off. At the next stage of operation, the output of the comparator CP$_3$ becomes High so that the aperture stopping-down motion is stopped. Subsequently, the switch S$_3$ is opened and the value of (Bv+Sv−Avs) is stored in the capacitor C$_2$ to start the automatic setting of the shutter time. The relation between aperture value and shutter time in this operation is shown at area A in FIG. 3. The voltage dividing ratio $\beta$ between resistors R$_1$ and R$_2$ determines the inclination of the curve at the area A.

When Ev is higher than 18, the aperture value is limited by its maximum F-number and a proper exposure is obtained by changing the shutter time, which is similar to the case of shutter priority AE mode. The relation between diaphragm value and shutter time in this operation is shown at area B in FIG. 3.

When Ev is lower than 10 and the switch S$_5$ is closed, the output of the comparator CP$_2$ becomes High at first and then the output of the comparator CP$_1$ becomes High in a manner similar to the case of shutter priority AE mode. Apeture stopping-down motion is stopped at F=4 and thereafter only the shutter time is changed so as to provide a proper exposure. The relation between diaphragm value and shutter time in this operation is shown at area C in FIG. 3.

When the switch S$_5$ is Off, the operation of the comparator CP$_1$ is neglected. Therefore, if Ev is lower than 10, the shutter time and the diaphragm value are variable depending on the voltage divided output by the resistors R$_1$, R$_2$ as far as the range of Ev of 10 to 6 is concerned (see area D in FIG. 3). In the range of Ev 6 to 1, only the shutter time changes, with the aperture being fixed at the minimum F-number, so as to obtain a proper exposure (see area E in FIG. 3).

Now, the exposure control operation for diaphragm priority AE mode will be described. In this case, the terminal c is selected by the mode changeover switch S$_6$.

In this position of the switch S$_6$, the non-inversion input of the comparator CP$_3$ is connected to GND (ground). Therefore, the output of the comparator CP$_3$ is always Low and the output of NAND gate G$_3$ remains always High. The magnet Mg1 never operates in this case. Lens aperture is therefore set to a desired diaphragm value manually by use of the preset diaphragm ring. For this forcedly preset diaphragm value, the shutter time is automatically set in accordance with the output of the operational amplifier OP$_2$ (output after stop-down) so as to provide a proper exposure. At this time, the output of the operational amplifier OP$_4$ is $\{Bv+Sv-Av_0-(Av'-Av_0)\}$ and that of the operational amplifier OP$_3$ is $\{Bv+Sv-Av_0-(\alpha-Av_0)\}$. These two outputs are compared with each other.

When $Bv+Sv-Av_0-(Av'-Av_0) > Bv+Sv-Av_0-(\alpha-Av_0)$, $$\alpha > Av' \tag{3}$$

As seen from the above, when the diaphragm value Av' preset by the preset diaphragm ring is smaller than $\alpha$ (in this example, $\alpha=4$ and therefore the preset F-number is smaller than 4), the output of the operational amplifier OP$_4$ becomes larger than that of OP$_3$.

Therefore, the output of the comparator CP$_2$ becomes Low when the above conditional formula (3) is satisfied. If the switch S$_5$ is On at this time, then the output of NOR gate G$_2$ becomes High. Consequently a current is allowed to flow into the LED D$_6$ through the current limiting resistor R$_4$. Thus, LED D$_6$ emits light.

In this manner, if one wishes to use also the automatic focusing apparatus even when diaphragm priority AE mode is selected, then the display indicates whether or not the preset diaphragm value is suitable for sutomatic focus adjustment.

Obviously many modifications and variations of the present invention are possible in the light of the above teachings. It is therefore to be understood that within the scope of the appended claim the invention may be practiced otherwise than as specifically described.

We claim:

1. An automatic exposure control apparatus for a camera comprising:
   (a) means for measuring the luminance value of an object;
   (b) first setting means for setting the diaphragm value of a photographic lens to a value in the range of the minimum diaphragm value to the maximum diaphragm value in response to said measuring means;
   (c) second setting means for setting the diaphragm value of the lens to a value in the range of from a certain determined diaphragm value which is larger than said minimum diaphragm value to the maximum diaphragm value in response to said measuring means;
   (d) means for selecting any one of the diaphragm value set by said first setting means and the diaphragm value set by said second setting means;
   (e) means for controlling the diaphragm in accordance with the selected diaphragm value; and
   (f) means for determining an exposure time from said selected diaphragm value and said luminance value of the object.

2. An automatic exposure control apparatus as set forth in claim 1, wherein said camera has an automatic focusing means for moving said lens to a position in focus to said object and operating means for enabling said automatic focusing means to operate, and said selecting means is disposed to select the diaphragm value set by said second setting means in response to said operating means.

3. An automatic exposure control apparatus for a camera comprising:
   (a) means for measuring the luminance value of an object;
   (b) first setting means for setting the diaphragm value of a photographic lens to a value in the range of the minimum diaphragm value to the maximum diaphragm value in response to said measuring means, said first setting means including means for determining an exposure time from said set diaphragm value and said luminance value of the object;
   (c) second setting means for setting the diaphragm value of the lens to a value in the range of from a certain determined diaphragm value which is larger than said minimum diaphragm value to the maximum diaphragm value in response to said measuring means, said second setting means including means for determining an exposure time from said set diaphragm value by said second setting means and said luminance value of the object;
   (d) means for selecting any one of said first setting means and said second setting means; and
   (e) means for controlling the diaphragm and a shutter in accordance with the set diaphragm value and the determined exposure time by said one of said first setting means and said second setting means.

4. An automatic exposure control apparatus for a camera provided with an automatic focusing apparatus with which the object distance is detected and the photographic lens is moved to a position in focus to the object by a driving system, said exposure control apparatus comprising:
   (a) means for measuring the luminance value of said object;
   (b) means for setting the diaphragm value of said lens to a value in the range of the minimum diaphragm value to the maximum diaphragm value in response to said measuring means;
   (c) means for controlling the diaphragm in accordance with the set diaphragm value;
   (d) operating means for enabling said automatic focusing apparatus to operate;
   (e) means operable in response to the operation of said operating means and disposed for acting on said diaphragm control means in such manner that when the set diaphragm value is smaller than a certain determined diaphragm value at which a determined depth of focus can be given to the taking lens, the diaphragm is controlled in accordance with said determined diaphragm value by said diaphragm control means; and
   (f) means for determining an exposure time from the diaphragm value of said diaphragm controlled by said diaphragm control means and the luminance value of the object.

5. An automatic exposure control apparatus as set forth in claim 4 wherein said diaphragm value setting means includes means for presetting an exposure time and means for setting the diaphragm value according to said preset exposure tiem and the luminance value of the object.

6. An automatic exposure control apparatus as set forth in claim 2 wherein said exposure time presetting means includes means for forming a signal indicative of said exposure time, said signal being variable in response to said measuring means.

7. An automatic exposure control apparatus for a camera provided with an automatic focusing apparatus with which the object distance is detected and the photographic lens is moved to a position in focus to the object by a driving system, said exposure control apparatus comprising:
   (a) means for measuring the luminance value of the object;
   (b) first setting means for setting the diaphragm value of the lens to a value in the range of the minimum diaphragm value to the maximum diaphragm value in response to said measuring means;
   (c) second setting means for setting the diaphragm value of the lens to a value in the range of from a certain determined diaphragm value at which a determined depth of focus can be given to the lens to the maximum diaphragm value in response to said measuring means;
   (d) operating means for enabling said automatic focusing apparatus to operate;
   (e) means for selecting any one of the diaphragm value set by said first setting means and the diaphragm value set by said second setting means, said selecting means being disposed to select the diaphragm value set by said second setting means in response to the operation of said operating means;
   (f) means for controlling the diaphragm in accordance with the selected diaphragm value; and
   (g) means for determining an exposure time from said selected diaphragm value and said luminance value of the object.

* * * * *